United States Patent [19]
Ballard et al.

[11] Patent Number: 4,608,303
[45] Date of Patent: Aug. 26, 1986

[54] PRODUCTION OF ARTICLES FROM MINERALS

[75] Inventors: Denis G. H. Ballard, Chester; Colin S. Cundy, Frodsham; Graham R. Rideal, Chester; David C. W. Morley, Preston, all of England

[73] Assignee: Imperial Chemical Industries PLC, London, England

[21] Appl. No.: 386,670

[22] Filed: Jun. 9, 1982

Related U.S. Application Data

[63] Continuation-in-part of Ser. No. 116,150, Jan. 28, 1980, abandoned, which is a continuation of Ser. No. 22,078, Mar. 19, 1979, abandoned, which is a continuation of Ser. No. 831,913, Sep. 9, 1977, abandoned.

[30] Foreign Application Priority Data

Sep. 23, 1976 [GB] United Kingdom ............... 39510/76
Dec. 9, 1976 [GB] United Kingdom ............... 51425/76

[51] Int. Cl.$^4$ .................................. B32B 19/00
[52] U.S. Cl. ....................... 428/357; 106/74; 209/2; 428/402
[58] Field of Search ............. 428/304.4, 312.2, 312.6, 428/313.7, 317.9, 446, 357, 402; 252/378 R; 106/DIG. 3, 74; 209/2, 4, 5

[56] References Cited

U.S. PATENT DOCUMENTS

| 3,076,546 | 2/1963 | Ziegler et al. | 106/DIG. 3 |
|---|---|---|---|
| 3,356,611 | 12/1967 | Walker et al. | 252/378 R |
| 3,455,850 | 7/1969 | Saunders | 521/170 |
| 3,466,222 | 9/1969 | Curtis | 428/316.6 |
| 4,130,687 | 12/1978 | Ballard et al. | 428/313.7 |

FOREIGN PATENT DOCUMENTS

| 1016385 | 1/1966 | United Kingdom | 428/446 |
|---|---|---|---|
| 1076786 | 7/1967 | United Kingdom | 428/446 |
| 1119305 | 7/1968 | United Kingdom | 428/446 |

*Primary Examiner*—William J. Van Balen
*Attorney, Agent, or Firm*—Cushman, Darby & Cushman

[57] ABSTRACT

Vermiculite ore is contacted with an aqueous solution with at least one salt of sodium, lithium or an organosubstituted ammonium cation followed by aqueous washing so that the ore swells. The swollen vermiculite in aqueous suspension is subjected to a shearing action until a suspension containing vermiculite particles having dimensions less than 50 microns is produced with elimination from the suspension of all particles having a diameter larger than 50 microns. Water can then be removed from the suspension.

22 Claims, No Drawings

PRODUCTION OF ARTICLES FROM MINERALS

This application is a continuation-in-part of application Ser. No. 116,150, filed Jan. 28, 1980, and now abandoned, which is itself a continuation of application Ser. No. 022,078, filed Mar. 19, 1979, and now abandoned, which is itself a continuation of application Ser. No. 831,913, filed Sept. 9, 1977, and now abandoned.

This invention relates to improved articles made of vermiculite, a process for the production of improved articles from vermiculite and a suspension suitable for use in the production of improved articles from vermiculite.

It is known that granules of vermiculite may be swollen by treatment with aqueous solutions of various salts followed by soaking the treated granules in water. It is also known to apply mechanical shear to the swollen vermiculite in water to delaminate the vermiculite structure and produce an aqueous suspension of tiny particles of vermiculite known as vermiculite lamellae.

The suspension of vermiculite lamellae can be used to form articles such as films and coatings by casting the suspension and removing water from it. Processes of the type described above for chemically delaminating vermiculite and producing films from the resulting suspension are described, for example, in United Kingdom Patent Specifications Nos. 1,016,385 and 1,119,305.

The production of vermiculite films and in particular the desirable size and shape characteristics of the vermiculite particles used to produce the films is described in detail in United Kingdom Patent Specification No. 1,016,385. Thus it is described that the flexible and strong properties of the films are due to the great extent of overlapping of individual sheets of the delaminated vermiculite and to the strong adhesive forces generated between those individual sheets. For this reason the principal object of the invention is stated as the conversion of crystals of vermiculite minerals into sheet-like fragments each of extreme thinness but relatively great lateral extent, in an aqueous medium. Care must be taken to prepare the suspension desirably without mechanically reducing the general anisotropy of the mineral flakes by permitting excessive tearing of these during the delamination step of the process. It is stated that as long as the shape anisotropy of the flakes is retained the actual particle size of the flakes may be varied over a considerable range. Suspensions are described of flakes having equal length and breadth dimensions approaching 100 microns and coarser suspensions comprising flakes of length and breadth each approaching 1000 microns. The general teaching of the specification is the use and desirability of suspensions containing large (e.g 100 up to 1000 microns) flakes.

United Kingdom Patent Specification No. 1,119,305 describes the production of paper from chemically delaminated vermiculite suspensions. This specification does not mention the size of the particles of vermiculite in the suspensions but the inference is that large flakes of vermiculite are required. Thus the concentration of swollen vermiculite granules in water which is subjected to shear to delaminate the granules is very low, preferably from 1-3% by weight. By using very low concentrations of vermiculite the tendency on applying shear to the swollen granules in water is towards the production of large flakes of vermiculite. Again, the fact that the vermiculite flakes, after flocculation, are deposited on conventional paper making screens to form a mat suggests that the suspension contains relatively large flakes of vermiculite.

We have now found, surprisingly and contrary to the general teachings of the prior art, that improved films or papers are obtained oy removing the relatively large particles of vermiculite from the suspension of vermiculite lamellae before forming films or papers from the suspension.

By the term "vermiculite" as used in this specification we mean all materials known mineralogically or commercially as vermiculite, including other phyllosilicate minerals (layer minerals) such as hydrobiotites or chlorite-vermiculites which contain a proportion of vermiculite-like layers and which can be delaminated in the same or similar manner as vermiculite. We have found that careful control of the swelling and milling stages in the delamination of vermiculite is advantageously followed by a particle size selection wherein suitably prepared tiny vermiculite lamellae are separated from the larger size particles in the suspension.

According to the present invention there is provided a process for the production of shaped articles from vermiculite comprising the steps of:

(1) swelling, by contacting vermiculite ore with an aqueous solution of at least one salt of sodium, lithium, or an organosubstituted ammonium cation, followed by aqueous washing, so that the ore swells to at least twice its original volume, (2) delamination of the swollen vermiculite, by subjecting the particles in the aqueous suspension from step (1) to a shearing action until a suspension containing vermiculite particles having dimensions less than 50 microns is produced, (3) elimination from the suspension from step (2) of all particles having a diameter larger than 50 microns and, (4) formation of shaped articles from the resultant aqueous suspension by the removal of water from the suspension whilst the article is being shaped against a solid surface by deposition of vermiculite particles from the suspension.

In step (1) of the process of the invention, it is preferred to allow the swelling of the vermiculite ore to proceed to at least four times its original volume and often best results are obtained when the swelling ratio is more than six to one. If desired, the vermiculite ore may be beneficiated prior to swelling to remove materials which are not swollen or are inadequately swollen by the treatment of step (1). A process for the beneficiation of vermiculite ore by removal of gangue materials therefrom is described in U.S. Pat. No. 3,076,546 and vermiculite ore beneficiated in this way may be used in step (1) of the present process to increase the degree of swelling achieved in step (1) of the process. The anions in the salts of lithium, sodium or substituted ammonium are preferably inert anions commonly found in stable salts of these cations, particularly anions which will not chemically decompose during the swelling process, for example halide ions and especially chloride ions.

The swelling may be carried out by soaking the ore in aqueous solutions of the salts at a variety of temperatures; usually temperatures above ambient produce a result more quickly, and therefore it is preferred to reflux the aqueous solution with the ore.

The maximum extent of swelling is achieved by washing the ore with pure water and soaking the treated ore in water subsequent to the contact with the solutions of the salts. It is often preferred to treat the ore consecutively with solutions of two different salts and to wash the ore with pure water between such treatments.

The delamination of the swollen vermiculite particles in the suspension occurs fairly easily provided some degree of shearing action is imparted to the suspension. Shear may be imparted by means of a mill, mixer, or macerator which contains a shearing element for example a rotary paddle or blade working in a confined volume, or a counter-rotating roller in a multi-roll mill. Alternatively, shear may be imparted by suitable vibratory treatment for example ultrasonic agitation of the suspension. If desired, material which has not been swollen or which has been inadequately swollen in step (1) of the process may be removed from the swollen vermiculite ore before the swollen ore is delaminated, as is described for example in United Kingdom Patent Specification No. 1,119,305 referred to hereinbefore.

The desired product of the delamination step (2) is a suspension of very small lamellae or platelets of vermiculite having one dimension (thickness) very much smaller than the other two dimensions, and accordingly we prefer not to impart a vigorous grinding action or a percussive action to the suspension which would tend to equalise the three dimensions of the particles. Suitably the preferred milling or maceration of the suspension may be performed by a high-speed rotary mixer for example a laboratory mixer containing a rotary paddle (such as "Greaves HS" Mark III) or a liquidiser used for domestic or culinary purposes. Some high intensity mills, for example a colloidal mill or a "Polytron" mixer, should be used with caution because they tend to break lamellae quickly after the required delamination has occurred and they should be used only for the minimum time necessary to achieve the desired suspension containing particles of size below 50 microns.

Achievement of a suitable suspension in step (2) is indicated by the flocculated viscosity of the suspension. The flocculated viscosity of the suspension is defined for the purposes of this specification as the maximum viscosity which a suspension, containing 3.5% by weight vermiculite solids, after flocculation with dilute hydrochloric acid, will exhibit at a shear rate of 58 $sec^{-1}$. A suitable suspension for the present invention is one of which the flocculated viscosity is not less than 100 centipoise, and we prefer the flocculated viscosity to be at least 400 centipoise before step (3) of the process is carried out.

The flocculated viscosity test provides a method whereby the delaminated step (2) may be monitored. In order to perform the flocculated viscosity test it is convenient to filter off the particles large than 50 microns from an aliquot of the suspension, to flocculate the vermiculite in this aliquot by adding dilute hydrochloric acid and to transfer this sample suspension to a viscometer such as a Haake Rotovisko RV3 viscometer. Varying amounts of dilute hydrochloric acid are added to different aliquots of the suspension, the viscosity of each is determined and from the results, the maximum viscosity attainable is determined. For example, from a graphical relation constructed for aliquots of 50 ml of suspension, it was observed that 20–30 ml of N/10 hydrochloric acid (or 1–5 ml of N.HCl) were required to give the maximum viscosity.

In step (3) of our process the particles larger than 50 microns are separated from the suspension. These larger particles are optionally returned to the process of either step (1) for further swelling or step (2) for further delamination. It is preferble to eliminate from the suspension all particles larger than 20 microns. This may suitably but not necessarily be performed in a second size-grading operation, preferably one of the same or similar type as the first operation. Although the particles greater than 50 microns will necessarily be separated off in step (3) when all particles greater than 20 microns are eliminated from the suspension, it is preferable not to attempt to eliminate the two groups of particle sizes in one operation. The particle size selection can be more efficiently performed in two stages than in a single stage.

For even better physical properties of shaped article produced from the suspension it is preferred to eliminate from the suspension all particles larger than 5 microns. Additionally the size distribution of the particles in the suspension desirably should not be excessively broad.

The particles size selection(s) performed in step (3) of the process are usually carried out on deflocculated suspension which have been milled to the required standard, the criterion for adequate milling being the flocculated viscosity test as described above peformed on flocculated suspensions. The elimination of particles larger than 50 microns (or smaller if desired) may be effected by any of the conventional methods of particle size separation, for example sedimentation, filtration, sieving, centrifuging and cyclone separation. Our preferred methods are filtration and sedimentation.

(a) Sedimentation

The suspension (either flocculated or not as desired) is mixed thoroughly to render it homogeneous and then allowed to stand undisturbed. After a suitable time, the supernatent suspension is run off from the material which has settled out on the bottom of the containing vessel. If required, the homogenised decantate can be treated again in the same way, for as many times as desired.

In this way, coarse particles (which settle out) may be separated from finer ones (which remain in the suspension). Although empirical judgements are often sufficient for the operation of the process, calculations based upon Stokes' law (considering the particles in terms of, for example, their equivalent spherical diameters) are also often helpful. For any particular suspension, the important variables are:

(i) time of settling, and
(ii) the height through which a given particle has to fall in settling The degree of flocculation of the suspension affects both variables since aggregation of the vermiculite particles by flocculation will influence both effective particle size and suspension viscosity.

For the operation of the invention a totally deflocculated suspension gives the best results since in this case all but the very smallest particles (colloidal) would eventually settle out. Therefore whenever a small particle size is required the suspension is left to stand for a long period of time (e.g. many hours or several days as required) so that the equilibrium condition is approached. If this is done it is observed (from electron microscopy) that the resulting suspension contains only particles of substantially smaller dimensions than 20 microns.

(b) Filtration

The above sedimentation procedure allows concentration of particles in wide ranges of particle size, but it is not the preferred method when fractions with a sharply defined size boundary are required. Such fractions are, however, obtainable by the use of filters with accurately known pore size, since particles with any dimension greater than the pore size cannot pass through. In some cases filtration may usefully complement sedimentation.

It is not always easy to filter deflocculation vermiculite suspensions, since the larger platelets of vermiculite tend to block the pores of the filter. To facilitate the process, various aids may be applied to clear the pores of the filter, for example mechanical or vibrational aids. Mechanical clearing of filter pores may be brought about by brushing or scraping; a rotating brush is convenient. Vibrational clearing may be brought about by mechanical vibration of the whole filter assembly. Alternatively, the filter gauze itself may be vibrated, e.g. ultrasonically.

For the delamination step (2) of the process, the concentration of vermiculite in the suspension may suitably be in the range of from 1% to 50%, most conveniently in the range of from 5% to 25%, by weight of vermiculite based on the suspension. For classification step (3) of the process, concentrations of from 1% to 25%, preferably from 5% to 10% by weight of vermiculite are usually employed.

The formation of articles in step (4) may be effected using suspensions of 5% to 10% concentration, but it is preferred to concentrate the suspension prior to step (4). Concentrations in the range of from 5% to 60% or 70% by weight of vermiculite, preferably from 10% to 40% by weight are advantageously used for producing sheets, because the removal of water from concentrated suspensions may be effected more quickly (thereby using less energy) than from more dilute suspensions.

The particles retained in the suspension according to the invention are those having particle dimensions of less than 50 microns. These are the large dimensions of the particles and because the particles are in the form of small platelets or lamellae they all have one very small dimension (the thickness of the plate), typically of the order of one thousandth or even one ten thousandth of the large dimensions.

The articles which are produced from the suspensions of vermiculite lamellae after drying include sheet, film, papers, coatings, crepe, capsules, sachets, castings and mouldings, composed substantially wholly of vermiculite lamellae adhering together by mutually attractive forces. Laminated or sandwich structures of vermiculite sheet or film with other materials, for example papers or plastics, may be made from the suspension by the process of the invention.

The articles as produced by the process of the invention are affected by liquid water but they may be made water resistant by an ion exchange process after shaping, for example by the process described in British Patent Specification No. 1,016,385.

Corrugated sheet may be prepared by either depositing the vermiculite suspension against a suitably contoured substrate or by impressing a dry sheet between shaped press platens or rollers. The corrugations may be produced in two directions e.g. longtitudinally and transversely and sheet so produced is not only decorative but also has improved mechanical properties e.g. elongation to break. Additionally, a large sheet so produced has improved handleability and drape. A plurality of layers of corrugated sheets may be cemented together to form a honeycombe, three dimensional structure.

Water may be removed whilst the article is being shaped either by evaporation with or without applied heat, or alternatively by absorption into an absorbent material of the shaping surface for example a mould using a method similar to the slip-casting process used in the pottery industry. Electrophoretic methods of deposition of the lamellae from the suspension may be used advantageously when rapid removal of water is required. After the bulk of the water has been removed by any of the aforementioned methods the vermiculite layer may be stripped from the surface against which it is shaped or alternatively it may be left in place as a non-combustible coating on the surface; a coating which has the added advantage of low water-vapour permeability.

It has been observed that vermiculite of American origin, which tends to delaminate more efficiently than that of South African origin, when made into sheet gives a much lower permeability to water vapour. For example a value has been observed for water permeability of vermiculite twice as good as that normally found for polypropylene film.

The vermiculite suspension may be applied to a substrate, for example a plastics material, by any of the known surface coating techniques, including spraying.

Materials such as wood, fibreboard and hardboard may be faced with vermiculite sheet by using a suitable adhesive or by forming the vermiculite sheet in situ on the materials. The vermiculite coating enables such materials to obtain an improved rating on British Standard Fire Tests e.g. an indicative Class I rating in the small scale surface spread of flame test, whereas the materials without the vermiculite coating would only obtain Class III to IV rating.

When the selection of particle sizes in the suspension is carried out according to the process of this invention, sheets having superior physical properties, particularly tensile strength and flexibility, may be produced. Vermiculite sheet or paper may usefully be applied as a facing or liner to an organic polymer foam e.g. polyurethane foam panels, using conventional lamination techniques in order to improve the fire resistance of such panels.

Vermiculite sheet according to the invention has been shown to withstand temperatures of at least 1000° C. without cracking, the sheet maintaining its physical integrity although certain of its physical properties may be modified.

Vermiculite sheet may be used for example in the following applications:

A. To provide a fire-proof barrier to control the burning of organic foams or of wood and other combustible products.

B. To provide a flexible fire-proof packaging material able to prevent the spread of fire either by itself or when laminated to other materials e.g. polymer films or paper.

C. To provide a combined fire- and moisture-resistant barrier (for example an external facing) for building materials.

D. As a flexible container for thermal insulation material which is of a powdered or fibrous nature to prevent the dispersion of the insulation either at high temperatures or after prolonged use.

E. To provide a flexible electrical insulation layer (e.g. a wrapping for cables) that will not disintegrate when exposed to fire or other high temperature conditions.

F. As a flexible fire-proof membrane that will provide a protected enclosure during fire conditions to restrict the spread of smoke or gases or other contamination.

G. As a protective flexible blanket or shield against sparks or flames e.g. from a welding torch.

H. As separators for articles being treated in furnaces or kilns or as spacers for valuable documents e.g. to reduce the risk of complete destruction by fire.

I. As a base substrate for written records that will withstand high temperatures and be relatively inert to attack by chemicals.

According to another aspect of the invention there is provided a sheet consisting of self-adhering lamellae of vermiculite prepared from an aqueous suspension, the sheet having a failure stress under tension of at least 8,000 $KNm^{-2}$, preferably at least 20,000 $KNm^{-2}$.

All the vermiculite sheet herein described display good flexibility under ambient conditions, i.e. sheets can be reverse folded (with creasing) many times without failing.

The failure stress measurements described herein were made under tension at a strain rate of 0.5 cm $min^{-1}$ and refer to sheet dried by vacuum desiccation over silica gel for 24 hours before the measurements.

The invention is illustrated by the following Examples:

EXAMPLE 1

A 1 Kg sample of South African vermiculite (known as Mandoval "micron" grade) was refluxed for eight hours in 5 liters of a saturated solution of sodium chloride. Excess salt was then washed out of the product with water. The vermiculite was then refluxed for 8 hours in 5 liters of a solution of n-butylammonium chloride (made by diluting a mixture of 1250 ml of Normal Hydrochloric acid and 120 ml of n-butylamine). After washing out excess salts, the product was left to swell in water. The fully swollen material (swelling ratio=6.0) was divided into 2 equal portions, (A) and (B).

Portion (A) was made up to 4 liters with water and milled for 1 hour in a "Greaves" high-speed mixer operating at 6000 rpm. Oversize material (>50 microns) was then removed from the product by a sedimentation procedure as follows, and the flocculated viscosity was measured at 500 centipoise. The homegeneous suspension was allowed to stand in an aspirator bottle (liquid height 22.1 cm) for 5 minutes, and the supernatant suspension was then decanted from the settled solids. The decantate was thoroughly stirred to render it homogeneous and was then treated similarly. Three further treatments were subsequently carried out, using a settling time of 10 minutes in each case. The liquid height before the final sedimentation was 15.3 cm. The final decantate (3290 ml) was designated suspension (A) and had a solids content of 4.6%. All the rejected residues were retained (see below).

Portion (B) of the swollen vermiculite was then treated in a similar manner to portion (A), giving suspension (B) (3530 ml) with solids content 4.6%, and further residues.

The residues from (A) and (B) above were then combined, made up to 4 liters with water, and milled and sedimented as described for suspension (A). The suspension produced was made up to 4470 ml and designated suspension (C): the solids content was 3.6%.

Examination of suspensions (A), (B) and (C) by electron microscopy showed the presence of:

(i) material <1 micron in diameter (ii) particles in the approximate diameter range 1–10 microns (iii) a few particles up to ca. 40 microns in diameter.

Evaporation of a sample of Suspension (C) gave vermiculite sheet of failure stress 22,251 $KNm^{-2}$ and tensile modulus 4149 $MNm^{-2}$. The sheet displayed good flexibility under ambient conditions and could be reverse folded (with creasing) at least twenty times without failing. Vermiculite sheet made by evaporation from Suspension (A) was similarly flexible and gave a failure stress of 23,195 $KNm^{-2}$ with tensile modulus of 1430 $MNm^{-2}$.

For purposes of comparison a vermiculite suspension was produced as described for suspension A except that oversize material (>50 microns) was not removed. The sheet produced from this non-classified suspension had a failure stress of only 4000 $KNm^{-2}$.

EXAMPLE 2

A 1 kg sample of South African vermiculite (as in Example 1) was refluxed in 5 l of saturated sodium chloride solution for half an hour and subsequently washed thoroughly in distilled water. After draining out excess water, the vermiculite was refluxed for 2 hours in 5 l of n-butylammonium chloride solution (prepared as described in Example 1). The vermiculite was then washed in distilled water and left to stand in water until maximum swelling has taken place (swelling ratio=4.8). A "Greaves" mixer was used to convert the swollen vermiculite into a suitable suspension of vermiculite lamellae (see Example 1).

On completion of the milling operation the oversize material (>50 microns) was removed by passing the suspension through a 50 microns stainless steel sieve and the flocculated viscosity was observed to be 500 centipoise. The solids content of the classified material was found to be 4.12 g/100 ml.

The suspension was dried overnight at room temperature in a fume cupboard, to form a sheet of thickness 0.13 mm. A failure stress and tensile modulus of 24,480 $KNm^{-2}$ and 1929 $MNm^{-2}$ respectively were recorded for the sheet. Flexibility of the sheet under ambient conditions was good, giving more than 20 reverse folds without failing.

By way of comparison, a sheet produced as described from a sample of the unclassified suspension had a failure stress of only about 4000 $KNm^{-2}$ and the sheet failed almost immediately upon reverse folding.

EXAMPLE 3

1 Kg of North American Vermiculite (Zonolite No 4) was subjected to the same processing conditions as in Example 2 (a swelling ratio of 5.6 was observed). The solids content of the filtered suspension (>50 microns) was found to be 3.5 g/100 ml.

Vermiculite sheets produced as in Example 2 had failure stresses of up to 50,592 $KNm^{-2}$ and tensile moduli of up to 6069 $MN^{-2}$. The flexibility of the sheets were similar to those in Examples 1 and 2.

By way of comparison sheets made from the unclassified suspension (adjusted to 3.5 g/100 ml concentration) exhibited poor flexibility and their failure stress was below 6000 $KN^{-2}$.

EXAMPLE 4

150 gm of South African Vermiculite (Mandoval 'micron' grade) was steeped in a 26.4% w/w solution of lithium chloride solution for 3 weeks, with occasional stirring.

At the end of this period the ore was thoroughly washed with distilled water and left to stand in distilled water until fully expanded (swelling ration=3.0).

The suspension of the expanded ore was then made up to 3 l with distilled water and milled in the "Greaves" mill for 1 hour at 6000 rpm. The coarse particles (of size greater than 50 microns) were sedimented out using the procedure described in Example 1. In this case the liquid height before the final sedimentation was 12.0 cm. The final decantate had a solids content of 22.2 g/100 ml.

Vermiculite sheet produced as in Example 2 from the classified suspension had a failure stress of 8,892 KNm$^2$ and a tensile modulus of 2012 MNm$^{-2}$. 14 reverse folds under ambient conditions were achieved before failure. By contrast sheet produced from the unclassified suspension was extremely weak and friable.

EXAMPLE 5

1 Kg of American Vermiculite was refluxed in a 30% w/w lithium chloride solution for 2 hours. The excess salt was intially washed away with tap water, the final washing and swelling being completed in distilled water. The final swelling ratio in this case was 9.0. The swollen ore was then milled in the "Greaves" mill as in Example 1 and filtered through a 50 microns sieve. The solids content of the filtered suspension was found to be 4.2 g/100 ml.

Vermiculite sheet produced as in Example 2 had a failure stress of 10,209 KNm$^{-2}$ and tensile modulus of 1283 MNm$^{-2}$. For purposes of comparison a sheet was made from the unclassified suspension. Its failure stress was about 3000 KN$^{-2}$.

EXAMPLE 6

An aqueous suspension of n-butylammonium vermiculite with solids content 3.6% was prepared as described in Example 1 (designated "suspension C"). 300 ml of this suspension were then allowed to stand at a liquid height of 9 cm for 80 hours, after which time the supernatant suspension (190 ml) was decanted from the sediment. The decantate contained 24% of the total solids originally present, and on evaporation gave a sheet of failure stress 30,424 KNm$^{-2}$ and tensile modulus 4866 MNm$^{-2}$.

Examination of the decanted suspension by electron microscopy showed it to contain only material <1 micron in diameter.

Similar results may be more rapidly obtained by the use of a low-speed (e.g. 4000 rpm) centrifuge to accelerate the sedimentation process.

EXAMPLE 7

An aqueous suspension of n-butylammonium vermiculite with solids content 4.6% was prepared as described in Example 1 (designated suspension A). The suspension was passed sequentially through filters of pore size 20 microns, 10 microns and 5 microns, using an ultrasonic probe to maintain flow through each filter. Samples of each filtered fraction and of the unfiltered suspension were evaporated to form sheets whose tensile properties were as given below. In a separate experiment, ultrasonic irradiation itself was found not to influence tensile properties.

| Maximum Particle Size (microns) | Failure Stress (KNm)$^{-2}$ | Tensile Modulus (MNm$^{-2}$) |
| --- | --- | --- |
| 50 | 23,195 | 1430 |
| 20 | 30,869 | 3416 |
| 10 | 43,821 | 4224 |
| 5 | 60,521 | 6091 |
| Comparison: | | |
| Unfiltered up to 500 microns | 4,000 | — |

After formation of a sheet of vermiculite, the tensile strength of the sheet may be increased (e.g. by up to 30%) by applying compression in a parallel plate press; for example pressures of the order of 10 Mnm$^{-2}$ for about 10 minutes are effective.

EXAMPLE 8

Two 3 Kg batches of South African vermiculite (Mandoval 'micron' grade) were refluxed for half an hour in 15 l of saturated sodium chloride solution and, then after thorough washing in distilled water, were refluxed for a further two hours in 15 l of n-butylammonium chloride solution as prepared in Example 1. The vermiculite ore was again thoroughly washed in distilled water and swelling began to take place. When placed in 20 l containers each batch reached a final swollen volume of 5.5 times the original volume of the ore. The two batches were then combined for the milling experiments. The solids content of the combined batch was adjusted to 9% by weight.

The swollen vermiculite was converted into a suspension using three different milling systems:

(a) 4 l batches were milled in a Greaves mixer at 6000 rpm.

(b) 2 l batches were milled in a similar rotor-in-stator mill (known as an Ilado mill) at approximately 15,000 rpm.

(c) 1 l. batches were milled in a Kenwood liquidiser as used for culinary purposes. The operating speed was 14,000 rpm.

The milled suspension in each case was classified by passing through a 50 microns sieve. To determine the maximum flocculated viscosity of each milled sample, increasing amounts of NHCl were added to 50 ml aliquots of the suspensions adjusted to 3.5% w/w solids content. After mixing the acid and the vermiculite suspension using a magnetic stirrer the flocculated suspension was rapidly transferred to a viscometer and the maximum viscosity measured. All viscosity determinations were made on a Haake Rotovisko RV3 viscometer running at a fixed shear rate of 58 sec$^{-1}$ and a temperature of 25° C. Vermiculite sheets were made from each of the suspensions (not flocculated) and the tensile strength measured on samples dried for 24 hours in a vacuum desiccator. The relationship between Failure Stress and flocculated viscosity is shown in the Table.

| Type of mill | Time of milling (mins) | % Conversion to 50 microns suspension* | Flocculated viscosity (cp) | Failure Stress KN$^{-2}$ |
| --- | --- | --- | --- | --- |
| Greaves | 45 | 37 | 630 | 32,700 |
| | 90 | 47 | 510 | 22,750 |
| Ilado | 2 | 35 | 650 | 27,050 |
| | 20 | 78 | 600 | 26,500 |
| Kenwood | 5 | 30 | 470 | 23,000 |

-continued

| Type of mill | Time of milling (mins) | % Conversion to 50 microns suspension* | Flocculated viscosity (cp) | Failure Stress KN$^{-2}$ |
|---|---|---|---|---|
| | 30 | 68 | 440 | 16,200 |

*% conversion is that percentage of the total vermiculite solids in the suspension which is converted to particles of size less than 50 microns.

What we claim is:

1. A process for the production of shaped articles from vermiculite comprising the steps of:
   (1) swelling, by contacting vermiculite ore with an aqueous solution of at least one salt of sodium, lithium, or an organosubstituted ammonium cation, followed by aqueous washing, so that the ore swells to at least twice its original volume,
   (2) delamination of the swollen vermiculite, by subjecting the particles in the aqueous suspension from step (1) to a shearing action until a suspension containing vermiculite particles having dimensions less than 50 microns is produced,
   (3) elimination from the suspension from step (2) of essentially all particles having a diameter larger than 50 microns and,
   (4) formation of shaped articles from the resultant aqueous suspension by the removal of water from the suspension whilst the article is being shaped against a solid surface by deposition of vermiculite particles from the suspension.

2. A process as claimed in claim 1 wherein the swelling of the ore is allowed to proceed to at least four times it original volume.

3. A process as claimed in claim 1 wherein the salt used in the swelling contains an inert anion which will not chemically decompose during the swelling process.

4. A process as claimed in claim 3 wherein the inert anion is a chloride ion.

5. A process as claimed in claim 1 wherein step (1) is conducted by refluxing the ore in an aqueous solution of salt and subsequently soaking the ore in pure water.

6. A process as claimed in claim 1 wherein after delamination all particles larger than 20 microns are eliminated from the suspension.

7. A process as claimed in claim 6 wherein all particles larger than 5 microns are eliminated from the suspension.

8. A process as claimed in claim 1 wherein step (2) is conducted using suspensions having a concentration in the range 1% to 50% by weight of vermiculite.

9. A process as claimed in claim 8 wherein the concentration is in the range 5% to 25% by weight.

10. A process as claimed in claim 1 wherein step (3) is conducted using suspensions having a concentration in the range 1% to 25% by weight.

11. A process as claimed in claim 10 wherein the concentration is in the range 5% to 10% by weight.

12. A process as claimed in claim 1 wherein step (4) is conducted using suspensions having a concentration in the range 5% to 70% by weight of vermiculite.

13. A process as claimed in claim 12 wherein the concentration is in the range 10% to 40% by weight.

14. A process as claimed in claim 12 or 13 wherein in step (4) the water is removed from the suspension by evaporation.

15. An article consisting of self-adhering lamellae of vermiculite produced by a process as claimed in claim 1.

16. An aqueous suspension of vermiculite lamellae produced by a process comprising:
   (1) swelling, by contacting vermiculite ore with an aqueous solution of at least one salt of sodium, lithium, or an organosubstituted ammonium cation, followed by aqueous washing, so that the ore swells to at least twice its original volume;
   (2) delamination of the swollen vermiculite, by subjecting the particles in the aqueous suspension from step (1) to a shearing action until a suspension containing vermiculite particles having dimensions less than 50 microns is produced, and
   (3) elimination from the suspension from step (2) of essentially all particles having a diameter larger than 50 microns.

17. A sheet consisting of self-adhering lamellae of vermiculite prepared from an aqueous suspension, the sheet having a failure stress of at least 8,000 KN$^{-2}$.

18. A sheet as claimed in claim 17 wherein the failure stress is at least 20,000 KNm$^{-2}$.

19. An aqueous suspension of vermiculite lamellae containing essentially only particles having a diameter of less than 50 microns.

20. An aqueous suspension of vermiculite lamellae containing essentially only particles having a diameter less than 50 microns and produced by a process comprising: swelling, by contacting vermiculite ore with an aqueous solution of at least one salt of sodium, lithium, or an organosubstituted ammonium cation, followed by aqueous washing, so that the ore swells to at least twice its original volume; and delamination of the swollen vermiculite, by subjecting the particles in the aqueous suspension to a shearing action until a suspension containing vermiculite particles having dimensions less than 50 microns is produced.

21. An aqueous suspension of vermiculite lamellae which upon removal of water forms a sheet having a failure stress of at least 23,000 KNm$^{-2}$.

22. A process as in claim 1 wherein the elimination step is carried out by separating particles larger than 50 microns from the suspension after shearing.

* * * * *